US006988665B2

(12) United States Patent
Schofield

(10) Patent No.: US 6,988,665 B2
(45) Date of Patent: Jan. 24, 2006

(54) GRAYSCALE SECURITY MICROPRINTING FOR IDENTIFICATION CARDS

(75) Inventor: Harry Schofield, Narragansett, RI (US)

(73) Assignee: Zebra Atlantek, Inc., Wakefield, RI (US)

( * ) Notice: Subject to any disclaimer, the term of this patent is extended or adjusted under 35 U.S.C. 154(b) by 15 days.

(21) Appl. No.: 10/316,432

(22) Filed: Dec. 11, 2002

(65) Prior Publication Data

US 2003/0106943 A1 Jun. 12, 2003

Related U.S. Application Data

(60) Provisional application No. 60/339,177, filed on Dec. 11, 2001.

(51) Int. Cl.
*G06K 19/00* (2006.01)

(52) U.S. Cl. ....................... 235/487; 235/382; 235/380

(58) Field of Classification Search ................ 235/380, 235/382, 382.5, 487
See application file for complete search history.

(56) References Cited

U.S. PATENT DOCUMENTS

| | | | | |
|---|---|---|---|---|
| 3,700,862 | A | 10/1972 | Snook et al. | 235/61.12 M |
| 4,544,181 | A | 10/1985 | Maurer et al. | 283/74 |
| 5,122,813 | A | 6/1992 | Lass et al. | 346/1.1 |
| 5,199,081 | A | 3/1993 | Saito et al. | 382/2 |
| 5,619,026 | A | 4/1997 | Chou et al. | 235/462 |
| 5,646,388 | A | 7/1997 | DpEntremont et al. | 235/380 |
| 5,668,874 | A | 9/1997 | Kristol et al. | 380/23 |
| 5,787,186 | A | 7/1998 | Schroeder | 382/115 |
| 5,869,822 | A | 2/1999 | Meadows, II et al. | 235/380 |
| 5,883,452 | A | 3/1999 | Masuda | 235/380 |
| 5,886,334 | A | 3/1999 | D'Entremont et al. | 235/380 |
| 5,950,179 | A | 9/1999 | Buchanan et al. | 705/38 |
| 5,956,067 | A | 9/1999 | Isono et al. | 347/176 |
| 6,000,621 | A * | 12/1999 | Hecht et al. | 235/494 |
| 6,010,068 | A | 1/2000 | Bozzo | 235/380 |
| 6,030,474 | A | 2/2000 | Isono et al. | 156/64 |
| 6,119,940 | A | 9/2000 | Klug | 235/462.04 |
| 6,173,896 | B1 * | 1/2001 | Murl | 235/487 |
| 6,180,318 | B1 * | 1/2001 | Fitzer et al. | 430/292 |
| 6,182,894 | B1 | 2/2001 | Hackett et al. | 235/380 |
| 6,202,933 | B1 | 3/2001 | Poore et al. | 235/493 |
| 6,283,188 | B1 | 9/2001 | Maynard et al. | 156/521 |
| 6,693,544 | B1 * | 2/2004 | Hebbecker | 340/573.1 |

* cited by examiner

*Primary Examiner*—Karl D. Frech
(74) *Attorney, Agent, or Firm*—Alston & Bird LLP

(57) ABSTRACT

The present invention provides counterfeit resistant ID cards where a microprinting security feature is applied to the card at the time and place of card issuance. The present invention further provides for an ID card that includes microprinted security information including a code by which the authenticity of the ID card can be cross verified. In accordance with the present invention a microprint text in a grayscale gradient is placed onto an ID card using a high accuracy multi-pass thermal printing technology. In using the process of the present invention, a three pass thermal printer is used that is configured to such a high tolerance, that the grayscale gradient microprinting is possible without producing significant artifacts. When this technique is applied, any imperfections that result from the use of lower quality printing equipment become immediately identifiable reducing the ability of counterfeiters to produce fake or altered ID cards.

22 Claims, 4 Drawing Sheets

GRAYSCALE SECURITY MICROPRINTING FOR IDENTIFICATION CARDS

CROSS-REFERENCE TO RELATED APPLICATIONS

This application is related to and claims priority from earlier filed provisional patent application No. 60/339,177, filed Dec. 11, 2001.

BACKGROUND OF THE INVENTION

The present invention relates to a process for printing ID cards using a thermal dye sublimation process and the ID cards produced thereby. More specifically, the present invention relates to a process whereby a thermal dye sublimation printing process is used for microprinting security features having a high degree of accuracy and pixel registration onto ID cards.

In the prior art, many different forms of ID cards include different types of security microprinting using certain words in the background of the ID. This is also a common feature on US and other foreign currencies and other forms of negotiable paper such as certified checks. In general, the microprinting appears as a kind of watermark on the background of the ID or may be imbedded into a shape contained on the ID card. For example, the Commonwealth of Massachusetts may microprint "Commonwealth of Massachusetts Official Document" across the entire background of the card in a diagonal pattern. Another example is the pattern placed in the background of a certified check that appears as the word void if the check is electronically scanned or copied. Typically, printing of this type is placed on the raw card stock itself when the raw stock is made and shipped to the issuing authority where the personalized information is printed onto the card at the card issuance location. In general, therefore, the microprinting is provided on the blank card stock when the card stock is received at the card issuance location.

The difficulty with applying this type of microprinting as described in the prior art is that it is typically completed using a single pass operation of black ink. While single pass printing is very clear and readable, it is also easily repeatable using most thermal printing technologies available on the market today. As a result, it is easy for counterfeiters to reproduce the microprinting security feature onto raw card stock and then apply the personalized ID information onto the card in a separate operation, thereby circumventing the security of the card. The other issue is that since the micro printing is placed onto the card stock at the point of manufacture, it is possible for a counterfeiter to obtain raw stock as the material passes through various warehousing, shipping and storage operations. In this manner, it is easy for a counterfeiter to create fraudulent ID cards simply by printing the desired personal information onto the raw cards that they obtain.

There is therefore a need for an identification card that includes a microprinted security feature that overcomes the above noted drawbacks while producing a card that is difficult to reproduce at a location other than the card issuance location. Specifically, there is a need for an ID card with a microprinted security feature that is applied at the time and place of the card issuance that cannot be easily reproduced using readily available imaging technology.

BRIEF SUMMARY OF THE INVENTION

In accordance with the present invention, a microprinting security feature is applied to the ID card at the issuance location at the time the card is issued. The current invention therefore provides for a process of producing an ID card that includes a microprinted security feature, which is applied at the time and place that the card is issued. The present invention further provides for an ID card that includes microprinted security information that is generated and applied at the time and place of issuance thereby further producing a code by which the authenticity of the ID card can be cross verified.

Typically, ID card issuance locations utilize a high quality three pass thermal color printing process to achieve color images on the ID cards that they issue. This type of printing process requires a printing device that provides a highly accurate print registration between each of the pixels printed onto the card during each of the three printing passes. In other words, each individual pixel that is printed during each pass of the respective colors of the print process must be overlaid onto one another exactly so that the final product of the printing process does not have fuzzy edges or print artifacts (stray pixels) giving an offset appearance to the final image.

The present invention places a microprint text in a grayscale gradient across selected locations of the ID card using this high accuracy printing technology. The gradient grayscale image gradually changes from a darker gray to a lighter gray across the designated infill area of the microprint feature. Since grayscale printing using a three-pass thermal printing device requires the precise overlapping of pixels from three different color passes, grayscale gradient printing is very difficult to accomplish using conventional thermal printers. In the present invention, a three pass thermal printer is configured to such a high tolerance, that the grayscale gradient microprinting is possible without producing significant artifacts. When this technique is applied with microprinted text, any imperfections that result from the use of lower quality printing equipment become immediately identifiable, and therefore reduces the ability of counterfeiters to produce fake or altered ID cards.

The benefits to the present invention are two fold. The first benefit is that the raw cards do not have to be pre-printed with the security microprinting. This saves on processing costs by eliminating an additional handling and printing step while also reducing the possibility that prepared cards may be obtained by counterfeiters during the warehousing, shipping or storing of the card stock. Secondly, since the grayscale gradient microprinting is very difficult to achieve without specialized printing equipment, it is difficult for a counterfeiter to reproduce an ID card having this feature. Fake cards would be detectable because when lower quality printing equipment is used to produce a card having this feature, the sloppy print registration of the grayscale gradient printing would be immediately identifiable. The entire background of the card would look fuzzy rather than displaying the sharp image of the microprinted text.

The process of the present invention therefore includes providing a blank piece of card stock for printing, printing an image onto the ID card using a highly calibrated multi-pass thermal printer that includes both the required ID card information and a gray scale gradient microprinted security text pattern. In addition, the present invention includes the ID card end product that is produced using the process of the present invention.

Another feature of the present invention lies in the generation of predetermined text at the point of issue for use in the gradient microprinting. The text for example may include a time, place and date stamp of the location where the card is issued. In addition, the text printed in this manner may be encrypted using some form of coding known only to the card issuing authority. For example, each issuing location may have a specific identification code that is printed onto the card that must be matched to authenticate the card. In another example, when the card is printed, the issuing authority would enter a record into the file system noting the time and place that the card was issued then place this information into the code in the microprinted text. If this information does not match the record of the issuing authority, the card is identified as a counterfeit.

Accordingly, one of the objects of the present invention is the provision of an ID card that includes a microprinted security feature that is applied at the time and place of card issuance. Another object of the present invention is the production of an ID card that includes a gradient grayscale microprinting security feature that is printed using a multiple pass printing process whereby a high degree of pixel registration is obtained to produce a clear and crisp image. A further object of the present invention is the provision of an ID card that is resistant to counterfeiting due to the inclusion of a grayscale microprinted security feature that includes encoding that relates to the time and place of the issuance of the card allowing the authenticity of the card to be verified. Yet a further object of the present invention, is the provision of a process whereby an ID card is produced to include a microprinted grayscale security feature that is placed onto the card at the time and place of card issuance using a multi pass thermal printer having a high degree of pixel registration.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

DETAILED DESCRIPTION OF THE INVENTION

Figure 1:
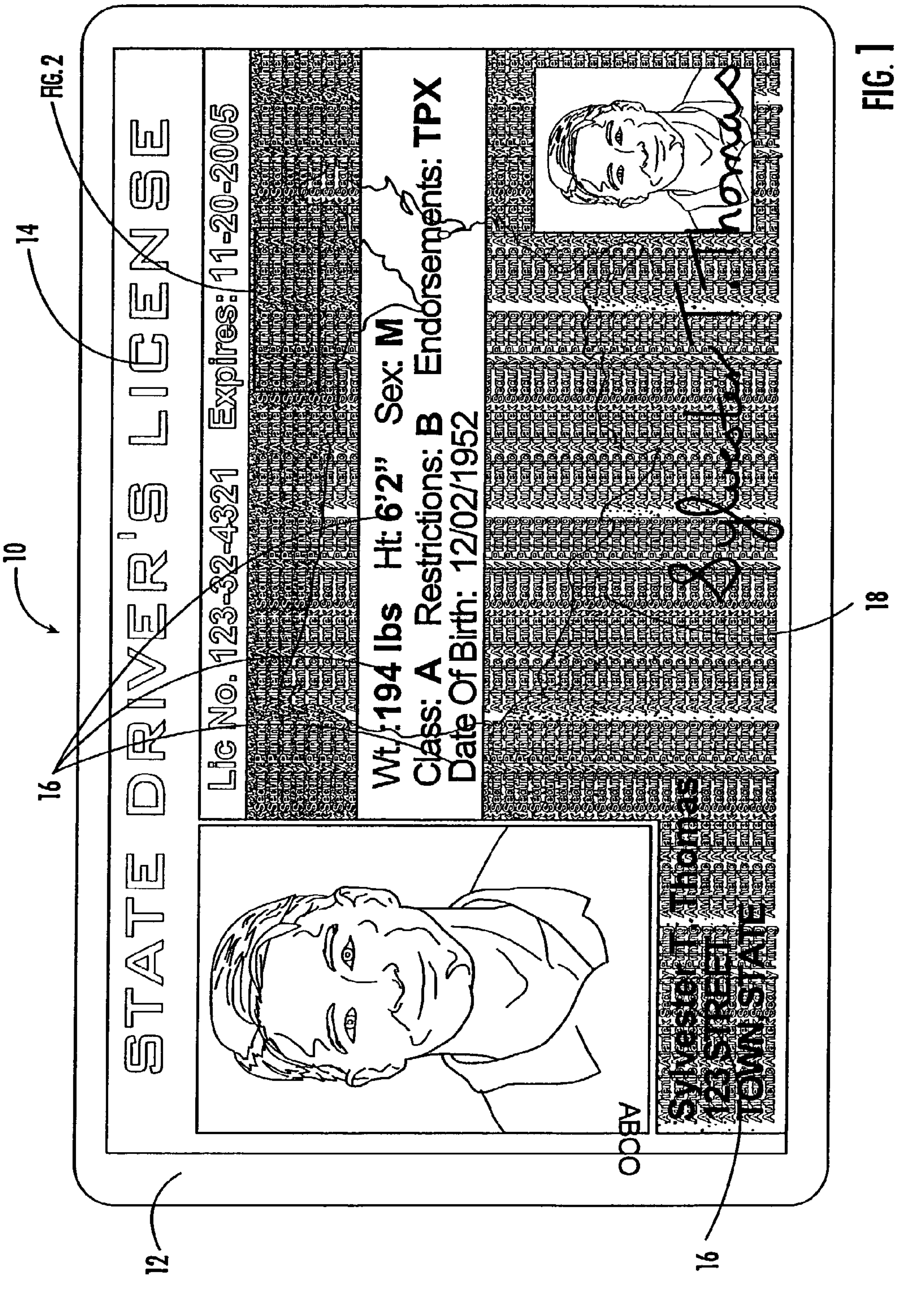
FIG. 1 is front view of the identification card of the present invention.

Referring now to the drawings, the identification card of the present invention is illustrated and generally indicated at 10 in FIGS. 1–4. The ID card 10 has a substrate 12 with indicia printed thereon. Portions of the indicia on the ID card 10 are specially placed and printed to enhance the security and deter the manufacture of counterfeit ID's as will be more fully described below. Further, the present invention provides for a method of manufacturing an ID card 10 that includes security printing that is placed onto the ID card 10 at the time and place of the issuance of the ID card 10 also further deterring the manufacture of counterfeit ID cards 10 as will also be described below. The present invention therefore provides a convenient and economical ID card 10 that is easy to produce while providing enhanced features that deter fraudulent issuance of fake ID cards 10 that has not been previously available in the prior art.

Turning to FIG. 1, the front of the ID card 10 of the present invention is shown. Typically, the card 10 includes a substrate material 12 onto which the relevant card features and information is printed. The substrate 12 may consist of a variety of constructions. In the preferred embodiment, the substrate 12 is a rigid plastic material onto which the indicia are printed directly. Further, the card 10 may include additional features such as a clear overlay (not shown) to further protect the printed indicia. Finally, the card 10 may also include a laminated cover (not shown) over the entire front and back surface of the card 10 to further protect the card 10 and prevent alteration of the front of the card. In addition, the substrate 12 onto which the card is printed is not limited to plastic but may also include paper or cardboard or any other sheet material suitable for printing as is known in the art.

The face of the ID card 10 includes several different types of printed indicia.

These indicia can be divided into three general categories. The first is the issuing authority information 14. This includes the generic information that is the same regardless of the person to whom the card 10 is issued and includes for example, the name of the issuing authority, the purpose of the ID, etc. This generic information 14 is maintained within the image file that is printed onto the card 10 and is combined with the other two categories of indicia for printing onto the ID card 10.

The second category of indicia is the biometric information 16 that is specific to each recipient of the ID card 10. This biometric information 16 includes the user's name, address, weight, height, date of birth, picture, signature, etc. and is customized to match the profile of each user to whom an ID card 10 is issued. This information is also included into the overall image to be printed onto the ID card 10.

Figure 2:
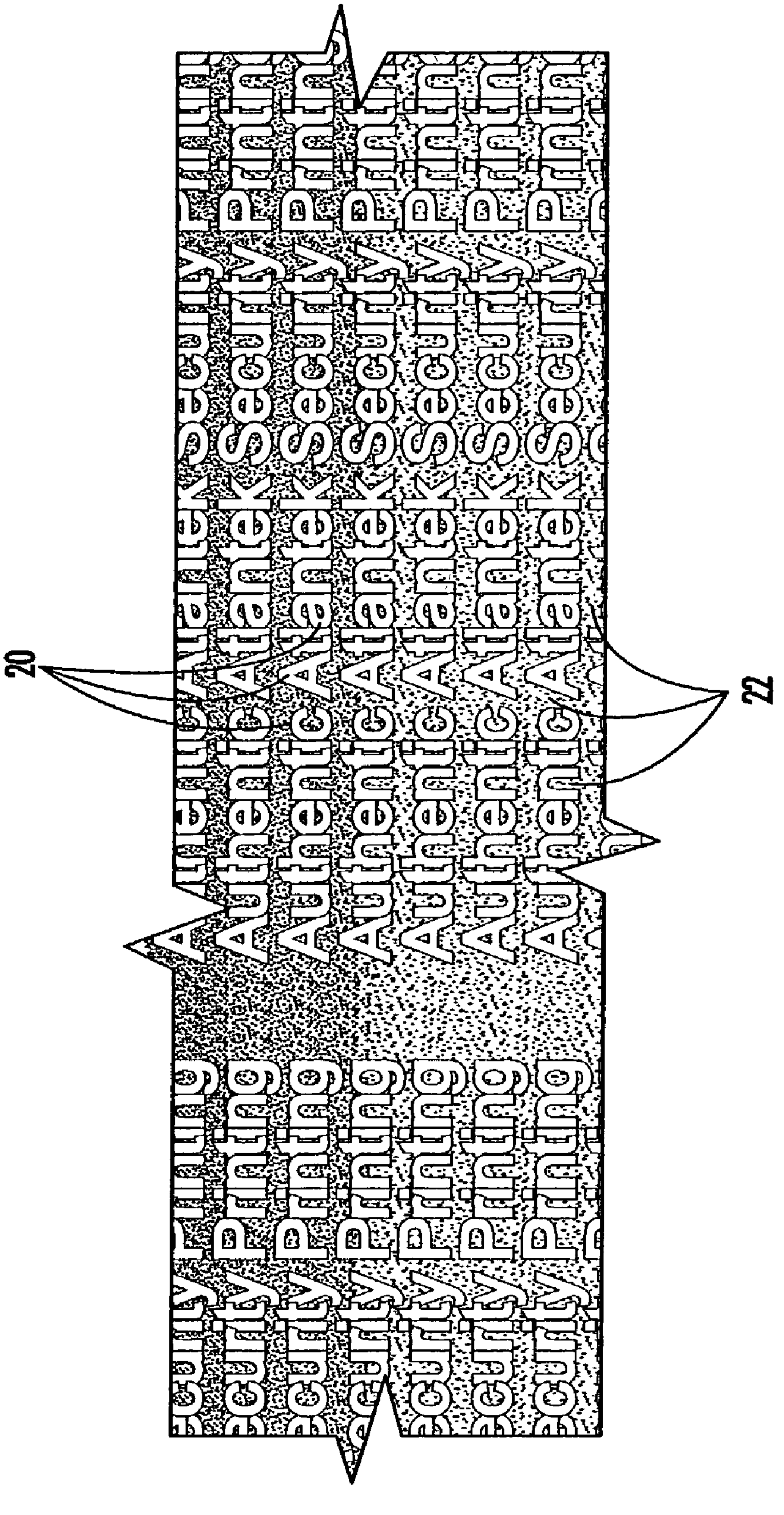
FIG. 2 is a close up view of the security printing thereon.

The final category of indicia printed onto the ID card is the security printing features 18. This component is critical to the present invention. The security indicia 18 of the present invention are printed in predetermined locations on the card 10 and appear as a background for areas of the card 10 that do not contain other information. The security indicia 18 are provided as a printed text 20 in a repeating pattern using continuous gradient gray scale shading 22. Specifically the security indicia 18 of the present invention is a microprint text 20 that is formed by printing a continuous grayscale gradient 22 across the background of selected locations of the ID card 10 using a high accuracy printing technology while selectively leaving voids 20 in the pattern 22 that form the text letters. The gradient grayscale security image 18 gradually changes from a darker gray to a lighter gray (or lighter to darker) across the designated infill area of the microprint feature. The microprinted security indicia 18 of the present invention is printed using a three pass thermal printer that is configured to such a high tolerance, that the grayscale gradient microprinting is possible without producing significant artifacts. When this technique is applied with microprinted text 18, any imperfections that result from the use of lower quality printing equipment become immediately identifiable therefore reducing the ability of counterfeiters to produce fake or altered ID cards. Turning now to FIG. 2 an enlarged view of the microprinted security indicia 18 is provided showing that the small text 20 requires a high degree of precision to produce a crisp image without producing stray pixels. Specifically, since a three pass printing process does not include a panel of black ink, the grayscale printing 18 must be done by combining the thermal transfer ink of the three passes and requires the precise alignment and overlapping of pixels from three different color passes. This type of grayscale gradient 22 printing is very difficult to accomplish using conventional thermal printers. Therefore, in the process of the present invention, a three pass thermal printer is used that is configured to such a high tolerance, that the grayscale gradient 22 microprinting is possible without producing significant artifacts. When this technique is applied with microprinted text 20, any imperfections that result from the use of lower quality printing equipment become immediately identifiable therefore reducing the ability of counterfeiters to produce fake or altered ID cards 10.

The indicia in all of the three above described categories, generic 14, biometric 16 and security 18, are all combined into a single image at the time and place of card issuance and printed onto the card substrate 12 in a single printing operation. The first benefit to producing the cards 10 in this manner is that the raw cards 10 do not have to be pre-printed with the security microprinting. This saves on processing costs by eliminating an additional handling and printing step while also reducing the possibility that prepared card stock may be obtained by counterfeiters during the warehousing, shipping or storing of the card stock. In addition, since the grayscale gradient microprinting 18 is very difficult to achieve without specialized printing equipment, it is difficult for a counterfeiter to reproduce an ID card 10 having this feature.

Figure 3:
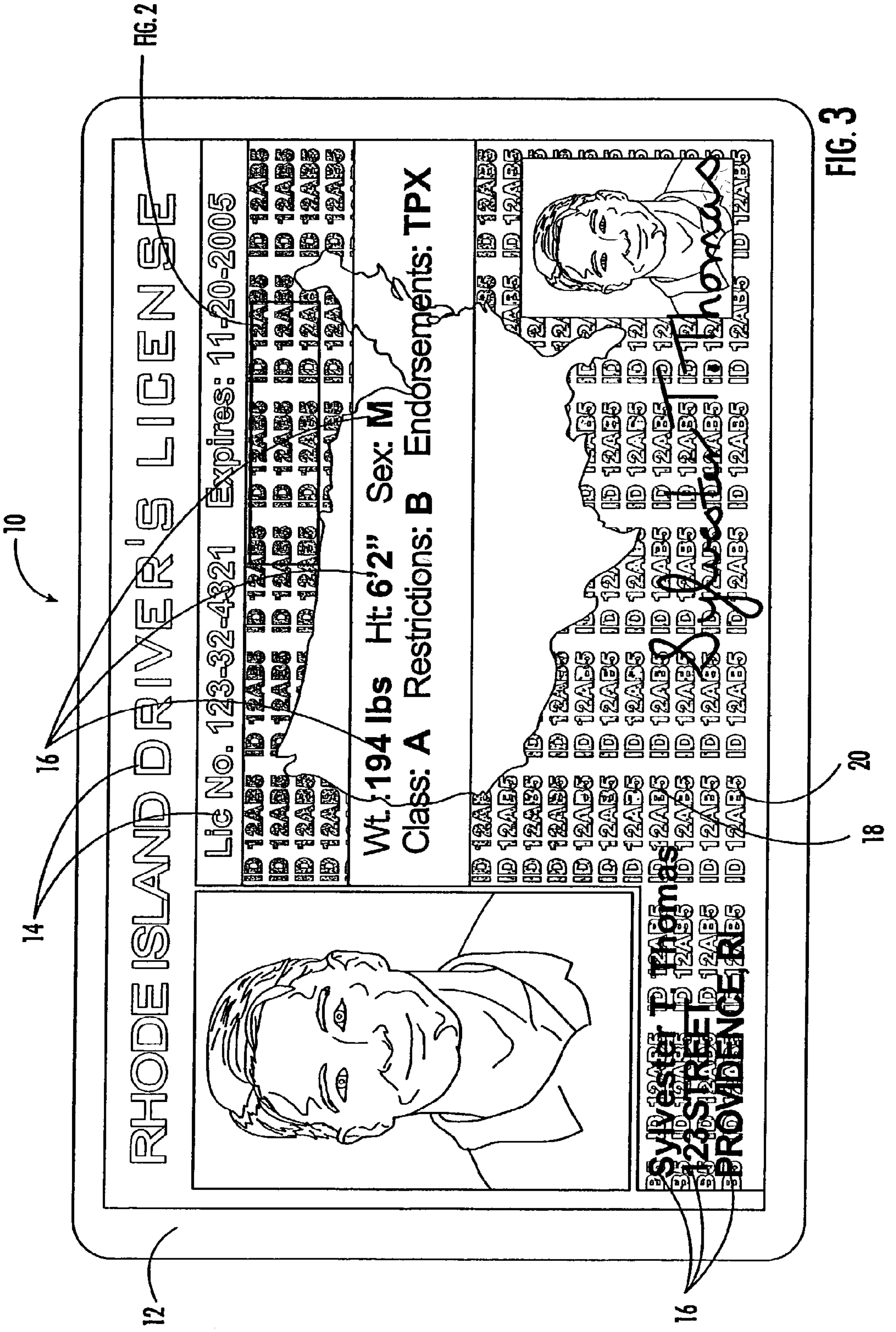
FIG. 3 is a front view of an alternate embodiment of the identification card of the present invention.
Figure 4:
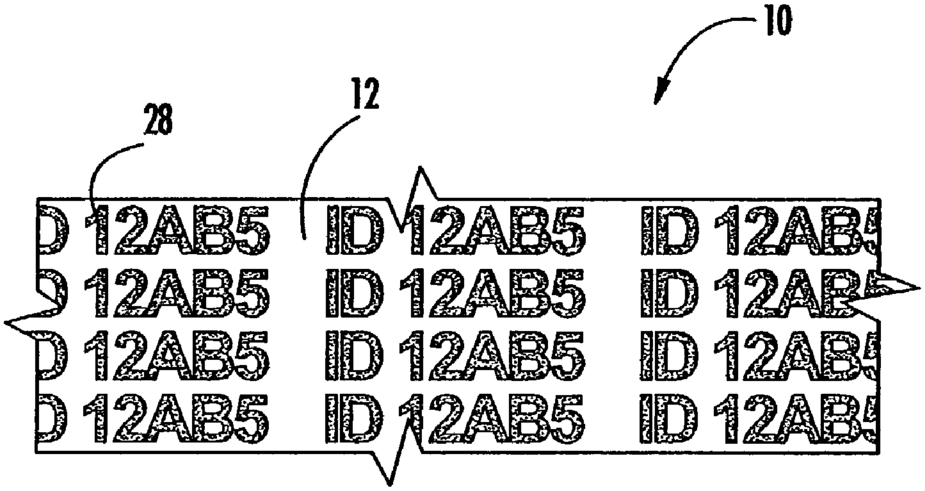
FIG. 4 is a close up view of the identification card of FIG. 3.

In turning to FIGS. 3 and 4, an alternate embodiment of the ID cards 10 of the present invention is shown. Rather than printing a continuous background 22 with voids 20 to create the text features, actual text 24 is printed directly in a continuous grayscale gradient as described above onto a clear background 26. This manner of providing the security text 18 includes all of the limitations and security features as described above relating to the printing of a grayscale pattern using a three-pass process color printing method.

Turning again to FIGS. 2 and 4 the microprinted security text 18 can be seen. The present invention provides for this text 18 to be a simple standard stock set of words that are repeated in the pattern such as the name of the issuing authority or as a code. FIG. 2 illustrates a stock security phrase while FIG. 4 illustrates a code 28. The use of a code 28 is also a security feature of the present invention. The code 28 is generated at the time and place of card issuance and can be used to verify the authenticity of the ID 10. For example, the issuing authority may have a code arrangement where a specific location code is combined with an issue date and a database record number and printed into the background of the ID card 10. In this manner, the code 28 can be compared to a database or record log of issued ID cards 10 to verify whether the code 28 matches a legally issued ID card 10. This code 28 may vary from issuance location to issuance location or be standardized among state authorities to facilitate training of individuals in the identification of fake ID cards 10.

The process of the present invention includes the provision of a blank substrate material 12 that is placed into the feeding mechanism of a high precision three-pass thermal printer. An image file is produced that includes the generic issuance information 14, the biometric information of the recipient 16 and the security-printing feature 18. The security feature 18 may be a stock security phrase or a code that is generated at the time and place of card issuance. The information is all combined and printed onto the card substrate 12 in one printing operation, thereby producing a finished ID card 10, ready for issuance.

It can therefore be seen that the present invention provides a unique ID card 10 and a method of producing the same that includes an integral security feature 18 that reduces the ability of a counterfeiter to produce fraudulent ID cards 10. Specifically, the present invention provides for a method of producing an ID card 10 in a single printing operation that reduces the opportunity that raw card stock can be obtained for fraudulent purposes while enhancing the security of the finished product. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. An identification card comprising:

a substrate having a front surface; and printed indicia on said front surface of said substrate, said printed indicia including at least one area having a continuous pattern of repeated text said continuous pattern being formed in a gradient gray print, wherein said continuous pattern is an array of colored pixels printed onto said substrate using a three-pass process color printing process.

2. The identification card of claim 1, wherein said colored pixels of each of the tree color passes are in a high degree of registration with one another to form said gradient gray print.

3. The identification card of claim 1, wherein said gradient gray print is a continuous gradient gray scale background pattern with voids therein, said voids forming predetermined letters.

4. The identification card of claim 3, wherein said predetermined letters form words.

5. The identification card of claim 3, wherein said predetermined letters form a code that is generated at the time and place where said identification card is printed, said code being verifiable to authenticate said identification card.

6. The identification card of claim 1, wherein said gradient gray print is a continuous gradient gray scale pattern of predetermined letters.

7. The identification card of claim 6, wherein said predetermined letters form words.

8. An identification card comprising:

a substrate having a front surface; and printed indicia on said front surface of said substrate, said printed indicia including at least one area having a continuous pattern of repeated text said continuous pattern being formed in a gradient gray print, wherein said gradient gray print is a continuous gradient gray scale pattern of predetermined letters, wherein said predetermined letters form a code that is generated at the time and place where said identification cord is printed, said code being verifiable to authenticate said identification card.

9. The identification card of claim 8, wherein said gradient gray print is a continuous gradient gray scale background pattern with voids therein, said voids fanning predetermined letters.

10. The identification card of claim 9, wherein said predetermined letters form words.

11. The identification card of claim 9, wherein said predetermined letters form a code that is generated at the time and place where said identification card is printed, said code being verifiable to authenticate said identification card.

12. The identification card of claim 8, wherein said predetermined letters form words.

13. A method of manufacturing an identification card comprising:

providing a substrate having a front surface; and printing indicia on said front surface of said substrate, said printed indicia including at least one area having a continuous pattern of repeated text said continuous pattern being formed in a gradient grayscale print, wherein said step of printing further comprises: printing a continuous array of colored pixels onto said substrate using a three pass process color printing process, wherein a first printing pass using a first color is applied to said substrate, a second printing pass using a second color is applied to said substrate in registration with said first printing pass and a third pass using a third color is applied to said substrate in registration with first and second printing passes, said first, second and third printing passes being in a high degree of registration with one another.

14. The method of manufacturing an identification card of claim 13, wherein said continuous grayscale print is a continuous gradient gray scale background pattern with voids therein, said voids forming predetermined letters.

15. The method of manufacturing an identification card of claim 14, wherein said predetermined letters form words.

16. The method of manufacturing an identification card of claim 14, wherein said predetermined letters form a code that is generated at the time and place where said identification card is printed, said code being verifiable to authenticate said identification card.

17. The method of manufacturing an identification card of claim 13, wherein said continuous grayscale print is a continuous gradient gray scale pattern of predetermined letters.

18. The method of manufacturing an identification card of claim 17, wherein said predetermined letters form words.

19. The method of manufacturing an identification card of claim 17, wherein said predetermined letters form a code that is generated at the time and place where said identification card is printed, said code being verifiable to authenticate said identification card.

20. A method of manufacturing an identification card comprising:

providing a substrate having a front surface;

generating a code corresponding to the day and time said identification card is being manufactured; and printing continuous array of colored pixels to form indicia and at least one area of gradient grayscale print using a three pass process color printing process, wherein a first printing pass using a first color is applied to said substrate, a second printing pass using a second color is applied to said substrate in registration with said first printing pass and a third pass using a third color is applied to said substrate in registration with first and second printing passes, said first, second and third printing passes being in a high degree of registration with one another, said continuous pattern displaying said code.

21. The method of manufacturing an identification card of claim 20, wherein said area of grayscale print is a continuous gradient gray scale background pattern with voids therein, said voids forming said code.

22. The method of manufacturing an identification card of claim 20, wherein said area of grayscale print is a continuous gradient gray scale pattern of text displaying said code.

* * * * *

UNITED STATES PATENT AND TRADEMARK OFFICE

CERTIFICATE OF CORRECTION

PATENT NO. : 6,988,665 B2
DATED : January 24, 2006
INVENTOR(S) : Schofield

It is certified that error appears in the above-identified patent and that said Letters Patent is hereby corrected as shown below:

<u>Column 6,</u>
Line 26, "tree" should read -- three --.

Signed and Sealed this

Thirteenth Day of June, 2006

JON W. DUDAS
*Director of the United States Patent and Trademark Office*